US011296561B2

(12) United States Patent
Zhang et al.

(10) Patent No.: US 11,296,561 B2
(45) Date of Patent: Apr. 5, 2022

(54) MOTOR FOR CEILING FAN

(71) Applicant: FOSHAN CARRO ELECTRICAL CO., LTD., Foshan (CN)

(72) Inventors: Jiansheng Zhang, Foshan (CN); Ruhui Huang, Foshan (CN); Hanhua Huang, Foshan (CN); Jianming Liang, Foshan (CN)

(73) Assignee: Foshan Carro Electrical Co., Ltd., Foshan (CN)

( * ) Notice: Subject to any disclaimer, the term of this patent is extended or adjusted under 35 U.S.C. 154(b) by 288 days.

(21) Appl. No.: 16/679,860

(22) Filed: Nov. 11, 2019

(65) Prior Publication Data

US 2020/0251939 A1 Aug. 6, 2020

(30) Foreign Application Priority Data

Jan. 31, 2019 (CN) .......................... 201910098553.8
Apr. 15, 2019 (CN) .......................... 201920501947.9

(51) Int. Cl.
*H02K 1/18* (2006.01)
*H02K 1/14* (2006.01)
*H02K 1/2786* (2022.01)
*F04D 25/06* (2006.01)
*H02K 7/14* (2006.01)
*H02K 21/22* (2006.01)
*H02K 1/30* (2006.01)

(52) U.S. Cl.
CPC ............. *H02K 1/187* (2013.01); *F04D 25/06* (2013.01); *H02K 1/146* (2013.01); *H02K 1/2786* (2013.01); *H02K 1/30* (2013.01); *H02K 7/14* (2013.01); *H02K 21/22* (2013.01)

(58) Field of Classification Search
CPC ...... H02K 1/187; H02K 1/146; H02K 1/2786; H02K 7/14; H02K 21/22; H02K 1/30; H02K 3/522; F04D 25/06; F04D 25/0606; F04D 25/088
See application file for complete search history.

(56) References Cited

U.S. PATENT DOCUMENTS

2017/0126090 A1* 5/2017 Chen ...................... H02K 3/522
2020/0200179 A1* 6/2020 Losio .................... F04D 25/062

* cited by examiner

*Primary Examiner* — Tulsidas C Patel
*Assistant Examiner* — Riley Owen Stout
(74) *Attorney, Agent, or Firm* — Rosenberg, Klein & Lee

(57) ABSTRACT

A ceiling fan has a motor and multiple fan blades. The motor has a stator assembly and a rotor assembly. The stator frame has a frame, a stator core, and multiple coils. The frame has multiple branch containers and multiple protrusions on the branch containers. The stator core is securely mounted in the frame. The coils are wound on the branch containers and protrusions. Therefore, the coils may be an ellipse and thus the magnetic flux therein is larger, which converts electric energy torques to drive the rotor assembly in higher efficiency. Besides, the rotor has multiple magnetic components and each magnetic component has a magnetic pole. An amount of the magnetic poles is larger than that of the branch containers. The motor can provide a higher torque even at a lower rotating speed.

18 Claims, 12 Drawing Sheets

MOTOR FOR CEILING FAN

BACKGROUND OF THE INVENTION

1. Field of the Invention

The present invention relates to a motor and an application of the motor, especially to a motor that has a stator assembly providing larger magnetic fields and a rotor providing larger torques; the present invention also provides a ceiling fan comprising the motor mounted therein.

2. Description of the Prior Arts

A motor is a device for conveying or converting electric energy according to law of electromagnetic induction. For example, a DC brushless motor may have a shaft, a stator assembly, and a rotor assembly. The stator assembly is a static part of the motor and comprises a stator core, a stator frame, and multiple coils. The stator assembly is configured to generate the magnetic fields for rotating. When a conductor is moved in the magnetic fields, or when a static conductor in changing magnetic fields with time, or when a conductor is moved when changing magnetic fields, the conductor will cut the magnetic flux lines. Therefore, under the law of electromagnetic induction, the conductor may generate induced electromotive forces. However, in the conventional motor, the efficiency of converting electric energy is low.

Besides, if a ceiling fan adopts the conventional motor, the rotation speed is high and thus the noise is loud. Some consumers, especially consumers from North America, prefer a quiet ceiling fan providing gentle breezes. However, the current ceiling fans are not capable of satisfying such demands because the conventional motors cannot provide enough torque when operating at a low speed.

To overcome the shortcomings, the present invention provides a motor for a ceiling fan to mitigate or obviate the aforementioned problems.

SUMMARY OF THE INVENTION

The main objective of the present invention is to provide a motor for a ceiling fan that generates higher magnetic flux even in the same electric power compared to the conventional ceiling fan, and provides higher torque even at lower rotating speed.

The motor is configured to be mounted in a ceiling fan and comprises a stator assembly. The stator assembly comprises a stator frame, a stator core, and a plurality of coils. The stator frame comprises a first isolated frame, a second isolated frame, and a receiving space. The first isolated frame comprises a first casing, a plurality of first branch containers, and a plurality of first protrusions. The first casing has a first axial direction and a plurality of first radial directions perpendicular to the first axial direction. The first branch containers are mounted on the first casing and extend outward from the first casing respectively in the first radial directions. The first protrusions are respectively formed on the first branch containers. The second isolated frame comprises a second casing, a plurality of second branch containers, and a plurality of second protrusions. The second casing has a second axial direction parallel to the first axial direction and a plurality of second radial directions perpendicular to the second axial direction. The second branch containers are mounted on the second casing and extends outward from the second casing respectively in the second radial directions. Each one of the second branch containers corresponds to a respective one of the first branch containers in location. The second protrusions are respectively formed on the second branch containers. The receiving space is formed by the first isolated frame and the second isolated frame and located between the first isolated frame and the second isolated frame. The first protrusions protrude from a side, which is away from the receiving space, of the first casing, and the second protrusions protrude from a side, which is away from the receiving space, of the second casing. The stator core is securely mounted in the receiving space. Each one of the coils are wound around a respective one of the first branch containers and a corresponding one of the second branch containers.

Consequently, with the first protrusions respectively formed on the first branch containers and the second protrusions respectively formed on the second branch containers, the sectional area of each one of the coils may be an ellipse or an oval rather than a rectangle conventionally, so the magnetic flux therein is larger, which provides a stronger magnetic field and concentrates the magnetic poles thereof, and electric energy can be converted to torques to drive the rotor assembly in higher efficiency. Besides, because the amount of the magnetic poles of the rotor assembly is larger than the amount of the coils, the first branch containers, or the second branch containers, the motor can provide a higher torque even at a lower rotating speed.

Other objectives, advantages and novel features of the invention will become more apparent from the following detailed description when taken in conjunction with the accompanying drawings.

BRIEF DESCRIPTION OF THE DRAWINGS

FIG. 9 is a side view of the branch containers and the spoke portion in

FIG. 2;

DETAILED DESCRIPTION OF THE PREFERRED EMBODIMENTS

Figure 1:
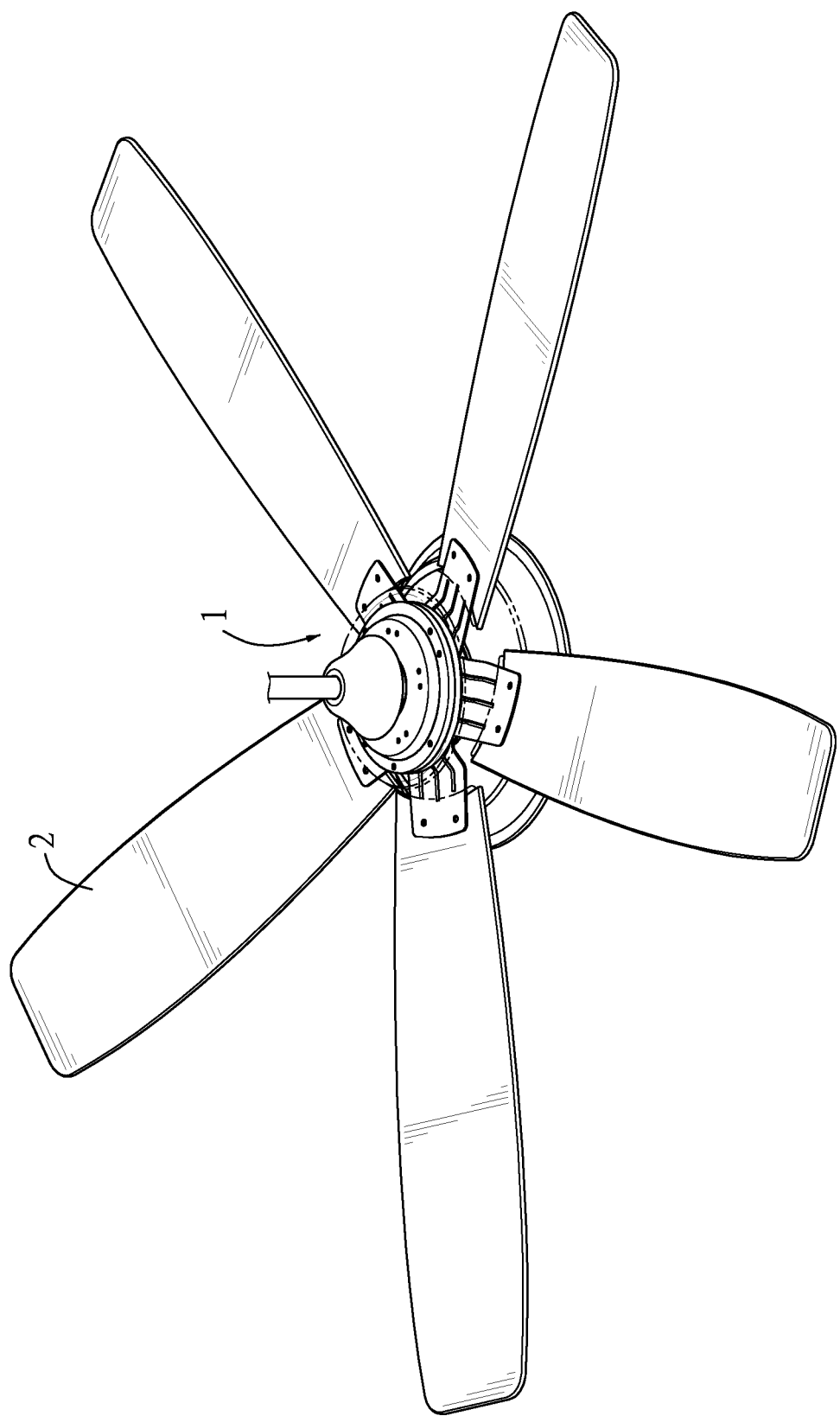
FIG. 1 is a perspective view of a ceiling fan in accordance with the present invention.
Figure 2:
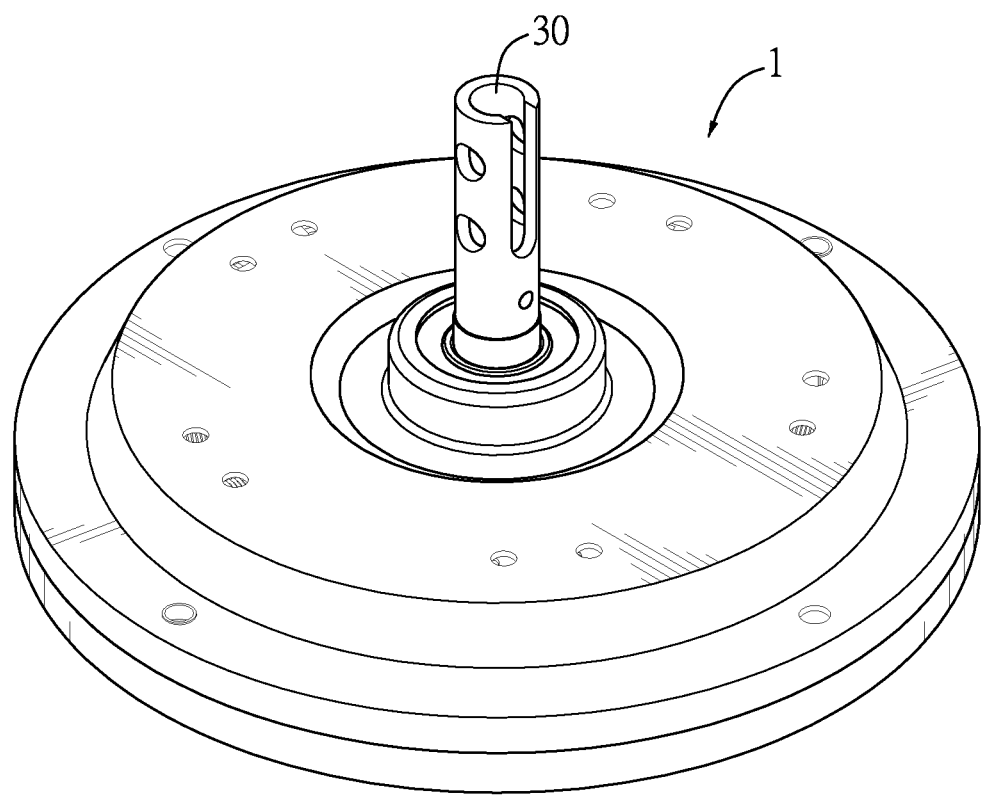
FIG. 2 is a perspective view of a motor of the ceiling fan in FIG. 1.

Please refer to FIG. 1 to FIG. 4. A ceiling fan in accordance with the present invention is provided with a motor 1 and a plurality of fan blades 2. The motor 1 comprises a stator assembly 10, a rotor assembly 20, and a shaft 30. The fan blades 2 are securely mounted on the rotor assembly 20.

Then please refer to FIG. 3 to FIG. 7. The stator assembly 10 comprises a stator frame, a stator core 14, and a plurality of coils 15.

The stator frame comprises a first isolated frame 11 and a second isolated frame 12 made from a non-conductive material. The first isolated frame 11 comprises a first casing 111 and a plurality of first branch containers 112. The first casing 111 has a first axial direction and a plurality of first radial directions perpendicular to the first axial direction. Each one of the first branch containers 112 is mounted on the first casing 111 and extends outward from the first casing 111 in a respective one of the first radial directions. The second isolated frame 12 comprises a second casing 121 and a plurality of second branch containers 122. The second casing 121 has a second axial direction parallel to the first axial direction and a plurality of second radial directions perpendicular to the second axial direction. Each one of the second branch containers 122 is mounted on the second casing 121 and extends outward from the second casing 121. Each one of the second branch containers 122 aligns with a respective one of the first branch containers 112 and extends outward from the second casing 121 in a respective one of the second radial directions. A receiving space 13 is formed by the first isolated frame 11 and the second isolated frame 12 and located between the first isolated frame 11 and the second isolated frame 12. The receiving space 13 is configured to receive the stator core 14. The stator core 14 comprises a joined portion 141 and a plurality of spoke portions 142. The joined portion 141 is located between the first casing 111 and the second casing 121. Each one of the spoke portions 142 is located between a respective one of the first branch containers 112 and the corresponding second branch container 122. The first isolated frame 11 further comprises a plurality of first protrusions 113, and each one of the first protrusions 113 is formed on a respective one of the first branch containers 112 and protrudes away from the receiving space 13. The second isolated frame 12 further comprises a plurality of second protrusions 123 and each one of the second protrusions 123 is formed on a respective one of the second branch containers 122 and protrudes away from the receiving space 13.

Figure 8:
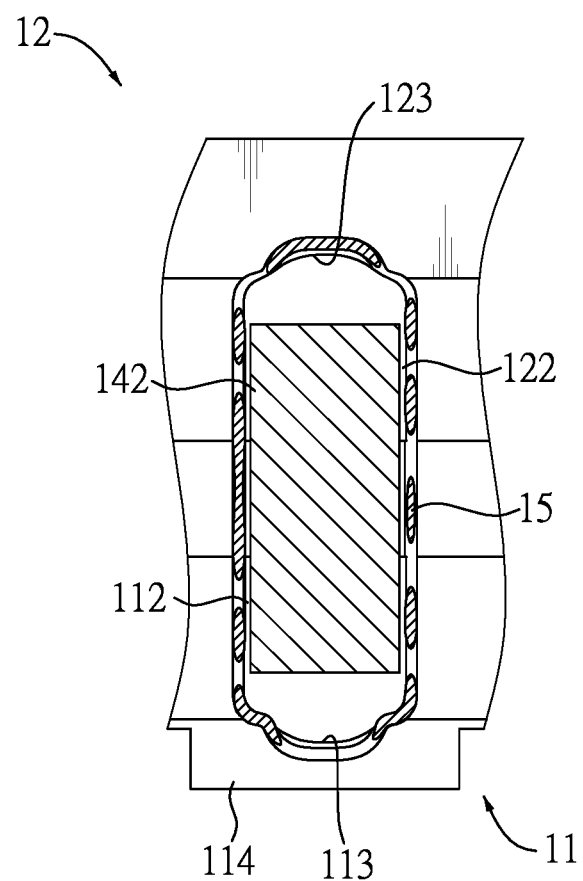
FIG. 8 is a sectional view of branch containers and one of spoke portions of the stator assembly in FIG. 2.
Figure 9:
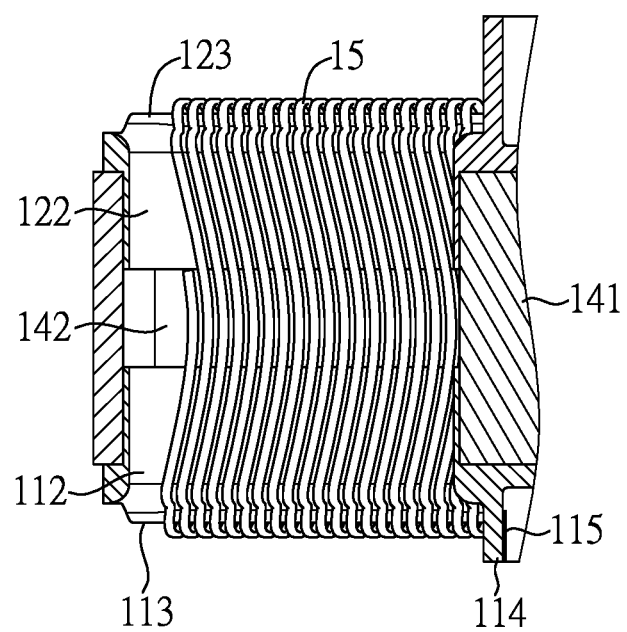
Figure 10:
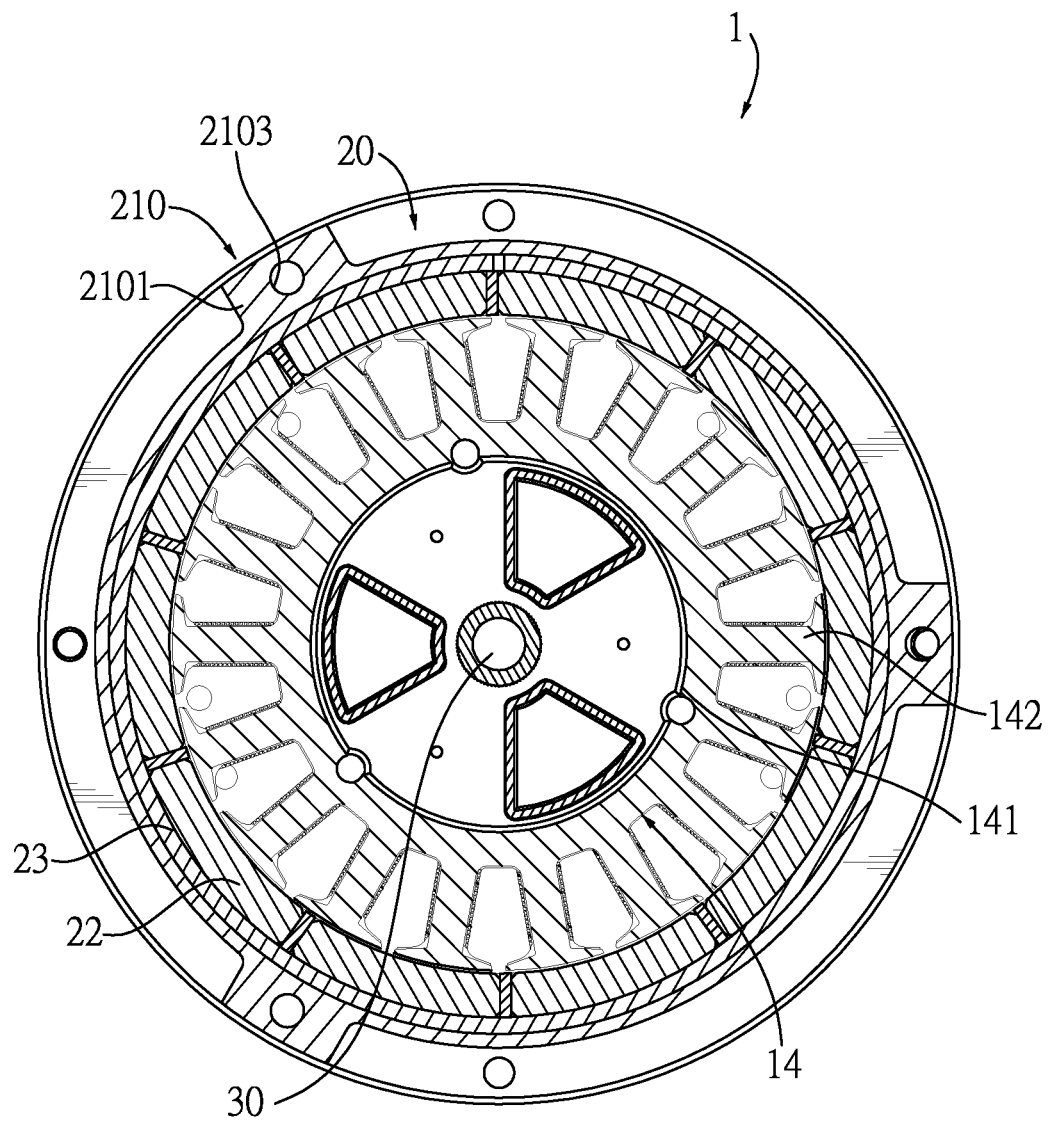
FIG. 10 is another sectional view of the motor in FIG. 2.

Then please refer to FIG. 8 to FIG. 10. Each one of the coils 15 is wound on a respective one of the first branch containers 112 and the corresponding second branch container 122. Because of the first protrusions 113 on the first branch containers 112 and the second protrusions 123 on the second branch containers 122, each one of the coils 15 wound on one first branch container 112, one first protrusion 113, one second branch container 122, and one second protrusion 123 may form two protruding portions upward and downward. In other words, the sectional area of each one of the coils 15 may be an ellipse or an oval rather than a rectangle. According to Ampere's circuital law, the elliptic coil 15 has lower magnetoresistance and thus the magnetic flux therein is larger, which provides a stronger magnetic field and concentrates the magnetic poles thereof, so electric energy can be converted to torques to drive the rotor assembly 20 in higher efficiency.

Besides, the first isolated frame 11 and the second isolated frame 12 may be made from plastic material, resin material, or other isolated material. The stator core 14 fitting in the stator frame may be made from silicon steel. For example, the stator core 14 may be a silicon steel sheet. The shaft 30 of the motor 1 is electrically isolated from the stator core 14, thereby enhancing the safety of the motor 1 during operation. By virtue of the first protrusion 113 and the second protrusion 123, when the coils 15 are wound on the first branch containers 112 and the second branch containers 122, the coils 15 may not be damaged or cut off by a sharp edge, which also enhance the safety during assembling and in use.

In a preferred embodiment, portions that join the first protrusions 113 and the first branch containers 112 are filleted, and/or portions that join the second protrusions 123 and the second branch containers 122 are filleted, which prevents the coils 15 from being damaged or cut off by sharp edges of the first isolated frame 11 and the second isolated frame 12.

Precisely, the first protrusions 113 may be arc-shaped and the portions that join the first protrusion 113 and the first branch containers 112 may be arc-shaped, too. In this embodiment, the second protrusions 123 may be arc-shaped and portions that join the second protrusions 123 and the second branch containers 122 may be arc-shaped, too. However, it is not limited thereto. In this embodiment, each one of the first branch containers 112 and the corresponding second branch container 122 form a track shape together, and thus the section of the corresponding coil 15 is also a track shape. As a result, the coils 15 can convert the electric energy to torque efficiency. In a preferred embodiment, tangents of the first protrusion 113 and tangents of the first branch containers 112 at the connected parts coincide with each other; tangents of the second protrusion 123 and tangents of the second branch containers 122 at the connected parts coincide with each other.

Then please refer to FIG. 4 to FIG. 7. The first casing 111 may comprise a first shaft mounting hole 1110 at a center thereof and the second casing 121 also has a second shaft mounting hole 1210 at a center thereof. The first shaft mounting hole 1110 and the second shaft mounting hole 1210 are aligned with each other and configured to mount the shaft 30 of the motor 1, and thereby the shaft 30 is fixed on the stator assembly 10.

The first isolated frame 11 comprises a plurality of barrier boards 114 and a plurality of notches 115. The barrier boards 114 are mounted on the first casing 111 and are respectively close to the first branch containers 112. The notches 115 are formed between the adjacent two barrier boards 114 Therefore, an amount of the notches 115 is corresponding to or even equal to an amount of the barrier boards 114 and an amount of the first branch containers 112. The notches 115 are disposed at positions staggered with respect to the first branch containers 112. When the stator assembly 10 is assembled, after each one of the coils 15 is wound on the first branch container 112 and the second branch container 122, a wire of the coil 15 can be engaged in one of the notches 115, which is beneficial to arrange the wires of the coils 15. In another embodiment, the first isolated frame 11 may comprise one barrier board and a plurality of notches formed on the barrier board.

One of the first casing 111 and the second casing 121 may comprise a projection and the other one may comprise a cavity so that the first casing 111 can be fixed on the second casing 121 via engaging the projection in the cavity. Precisely, in an embodiment, the first isolated frame 11 comprises a mounting projection 116 and the second isolated frame 12 comprises a mounting cavity 126, and the mounting projection 116 can be engaged in the mounting cavity 126. Precisely, with the mounting projection 116 engaged in the mounting cavity 126, the first isolated frame 11 and the second isolated frame 12 are easy to align with each other, which facilitates ease in assembly. In addition, the stator frame becomes more stable during operation because of the mounting projection 116 and the mounting cavity 126.

In a preferred embodiment, the first isolated frame 11 comprises multiple mounting projections 116 and the second isolated frame 12 comprises multiple mounting cavities 126. Each one of the mounting projections 116 corresponds to a respective one of the mounting cavities 126. Amounts of both the mounting projections 116 and the mounting cavities 126 may each be three, but it is not limited thereto. The mounting projections 116 are equi-angularly arranged in a peripheral direction of the receiving space 13.

The stator core 14 is configured to intensify the magnetic fields provided by the coils 15. However, the joined portion 141 is not received by any coil 15, so the joined portion 141 may not intensify the magnetic fields. Moreover, the conventional joined portion may occupy a whole chamber formed between the first casing 111 and the second casing 121. In other words, the joined portion 141 provided by the present invention has less volume, thereby saving material.

Figure 7:
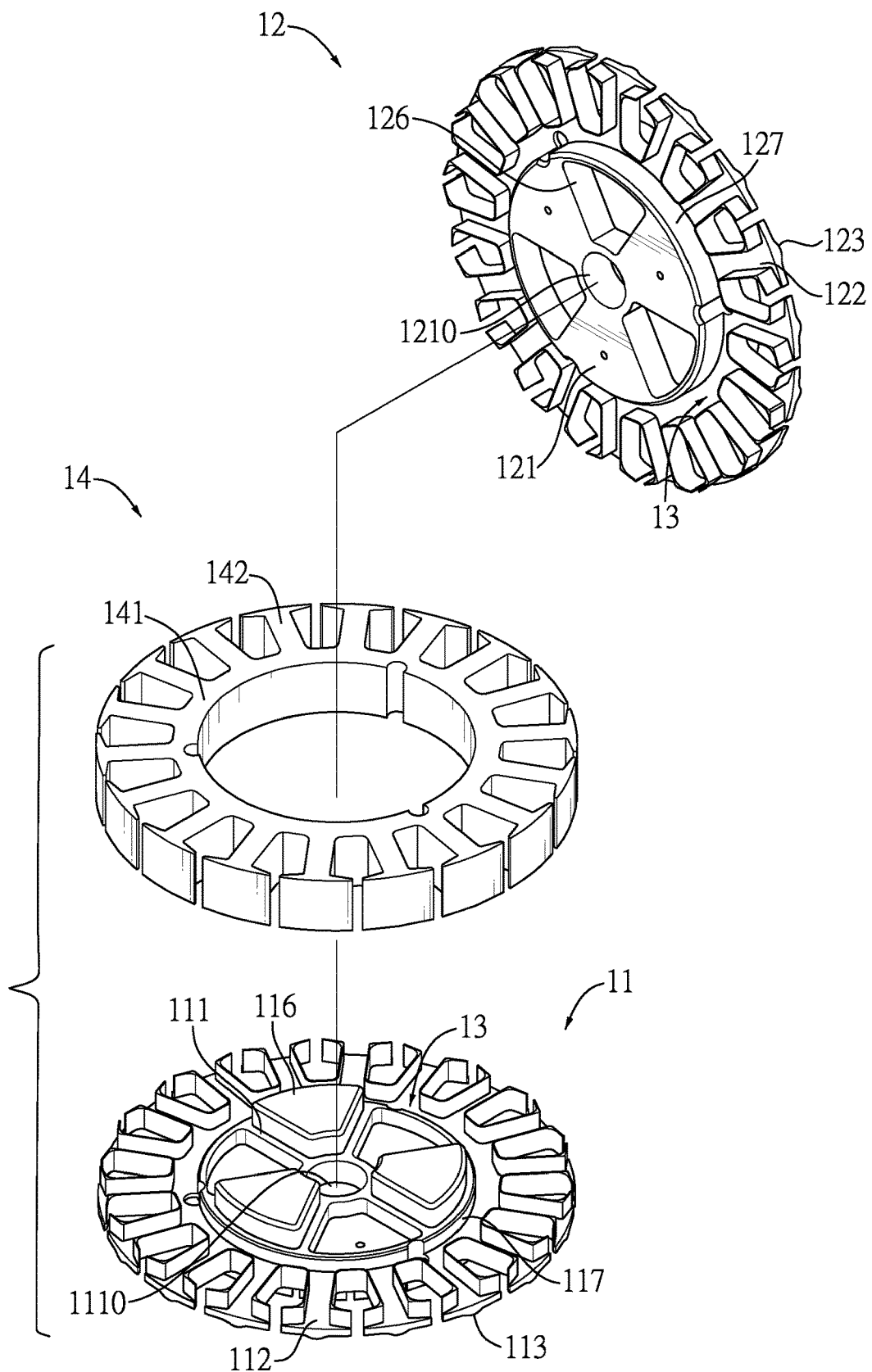
FIG. 7 is a sectional view of the stator assembly in FIG. 5.

Then please refer to FIG. 7 and FIG. 10. The first isolated frame 11 further comprises a first restriction annulus 117 mounted on the first casing 111 and located between the first casing 111 and the second casing 121. Besides, the second isolated frame 12 further comprises a second restriction annulus 127 mounted on the second casing 121 and located between the first casing 111 and the second casing 121. Besides, an outer wall of the second restriction annulus 127 is aligned with an outer wall of the first restriction annulus 117. In addition, both the first restriction annulus 117 and the second restriction annulus 127 are located in the receiving space 13 and thereby the receiving space 13 is divided by the first restriction annulus 117 and the second restriction annulus 127. Precisely, the stator core 14 is in the receiving space 13 but out of the first restriction annulus 117 and the second restriction annulus 127. In other words, the joined portion 141 is received between the first restriction annulus 117 and the first branch containers 112, and/or between the second restriction annulus 127 and the second branch container 122 and the joined portion 141 abuts the outer walls of the first restriction annulus 117 and the second restriction annulus 127. Therefore, the joined portion 141 may form an aperture with a larger diameter, thereby reducing the volume and saving the material, and the saved material can be used for manufacturing smaller stator cores 14 and iron loss is reduced. Furthermore, because of the aforesaid structures, the efficiency of converting electric energy to magnetic energy is improved, and the first restriction annulus 117 and the second restriction annulus 127 can secure the joined portion 141.

In another embodiment, only one of the first casing 111 and the second casing 121 has the restriction annulus close to the receiving space 13 and divides the receiving space 13 so that the stator core 14 is fixed out of the restriction annulus.

Figure 3:
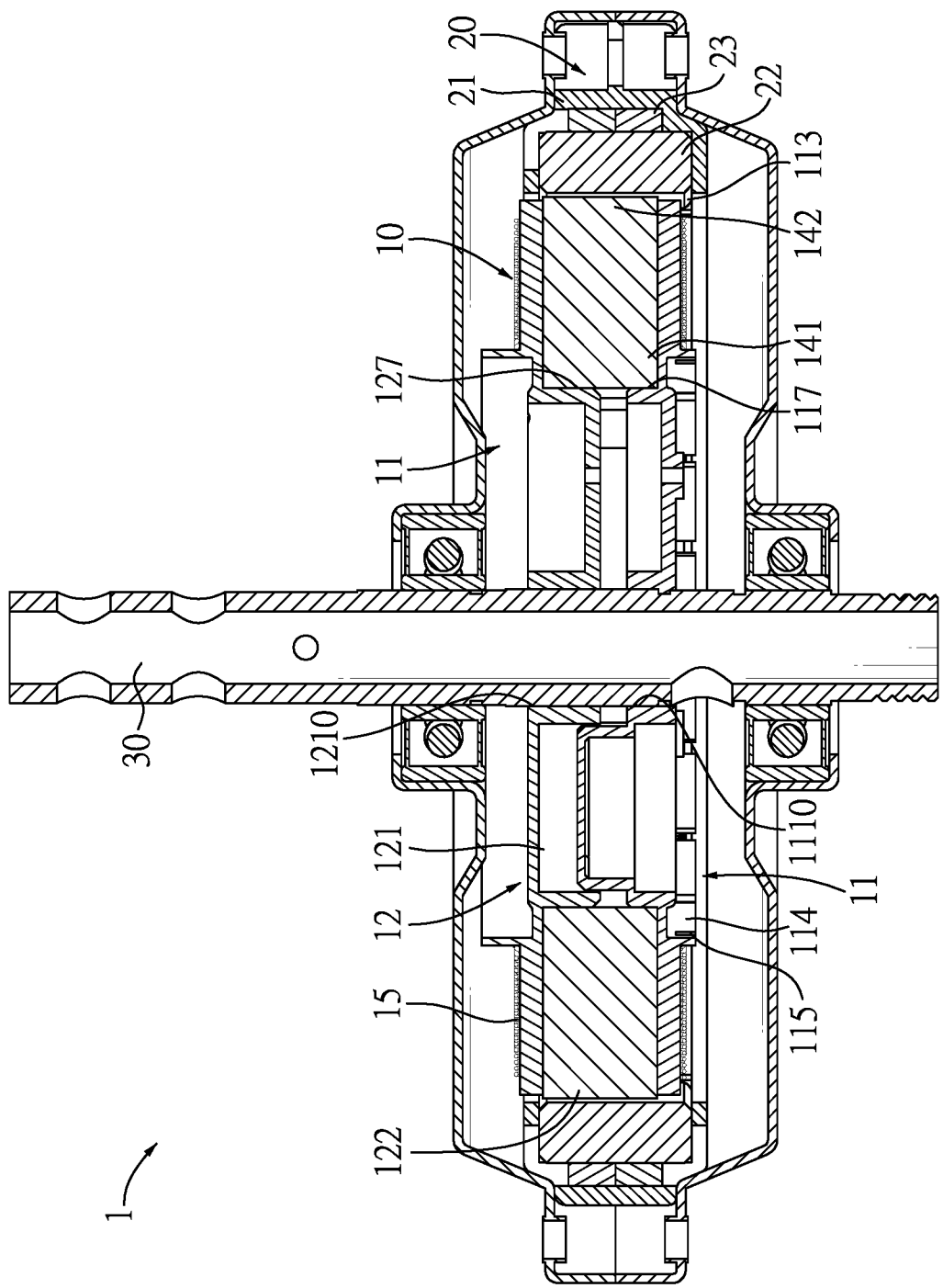
FIG. 3 is a sectional view of the motor in FIG. 2.
Figure 4:
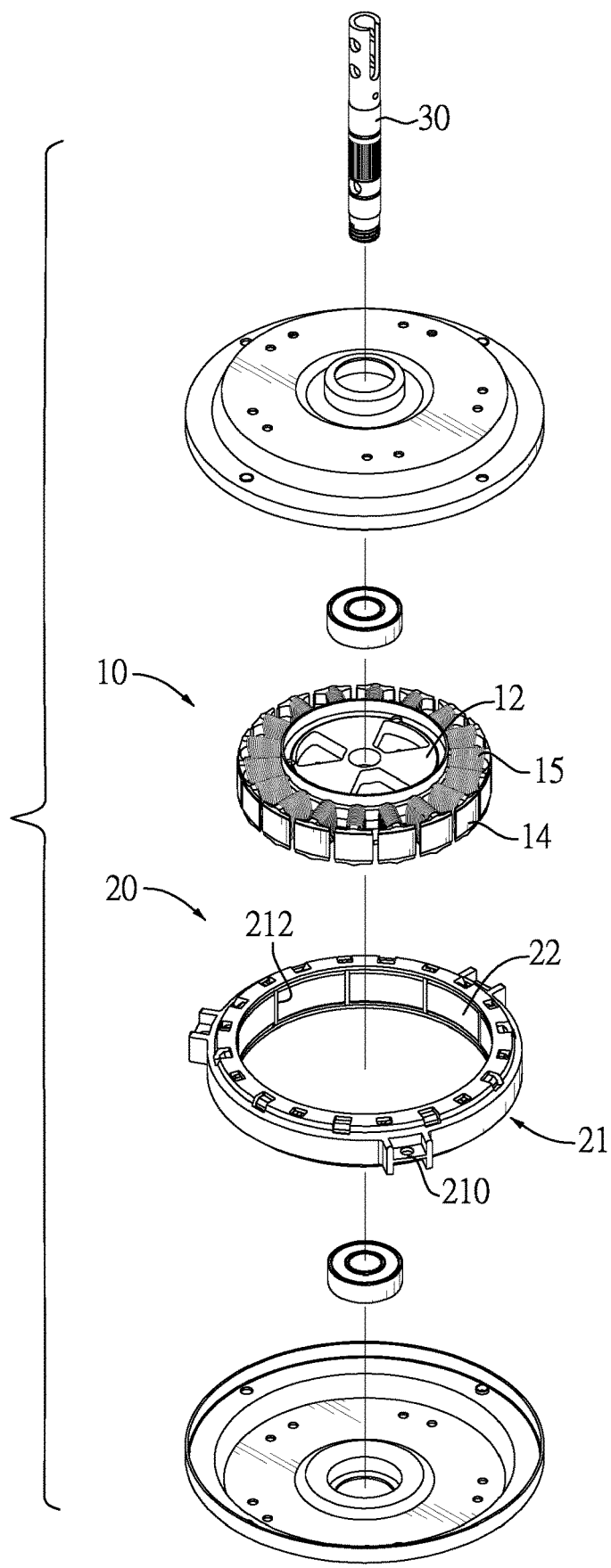
FIG. 4 is an expanded view of the motor in FIG. 2.
Figure 5:
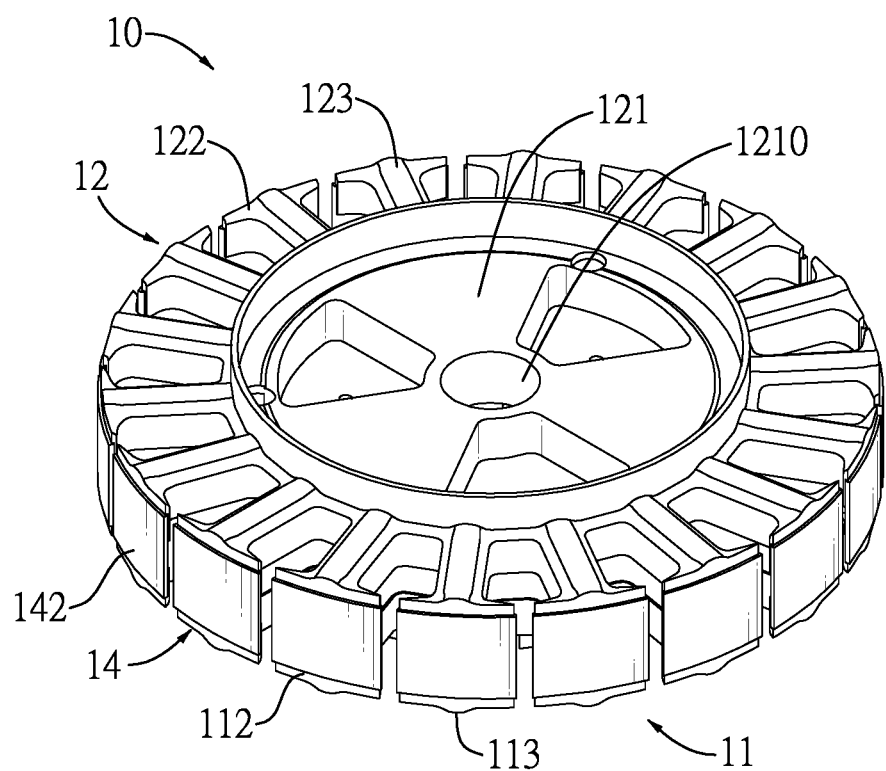
FIG. 5 is a perspective view of a stator assembly of the motor in FIG. 2.
Figure 6:
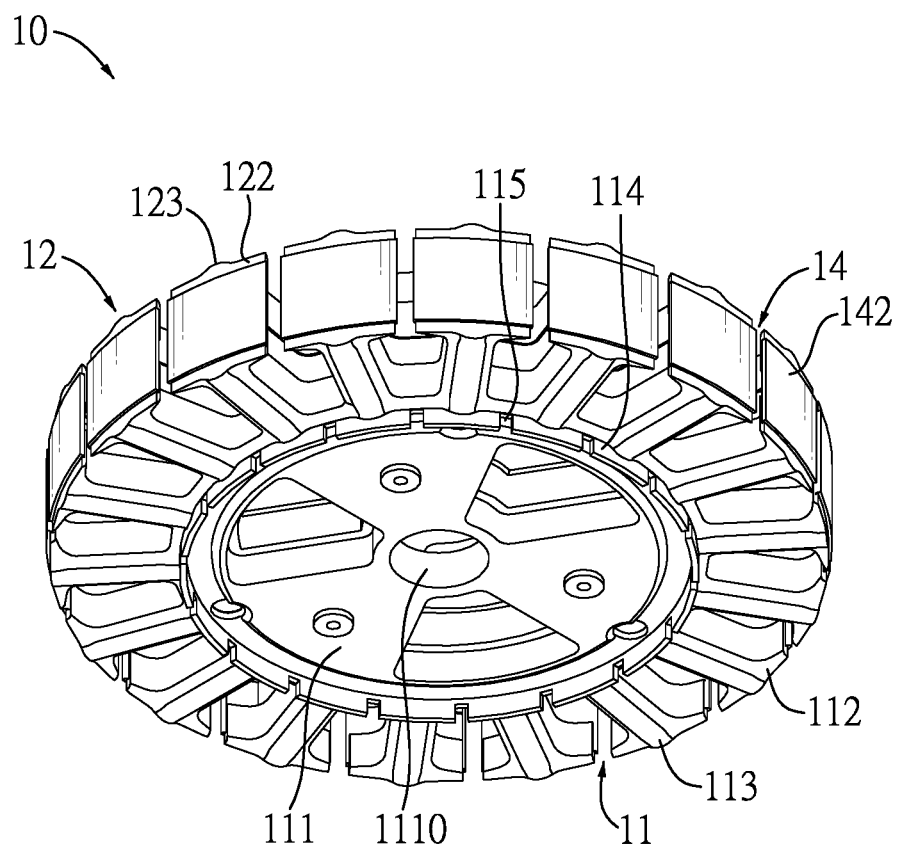
FIG. 6 is another perspective view of the stator assembly in FIG. 5.

Then please refer to FIG. 3, FIG. 7, and FIG. 10. The rotor assembly 20 is sleeved on the stator assembly 10 and spaced at an interval from the stator assembly 10. The rotor assembly 20 of the present invention can provide a higher torque even at a lower rotating speed. The rotor assembly 20 comprises an annular casing 21 and a plurality of magnetic components 22. The annular casing 21 forms a central space for receiving the stator assembly 10. The magnetic components 22 are arranged along with the annular casing 21 and each two adjacent magnetic components 22 are spaced apart at an interval. Precisely, the annular casing 21 may define a peripheral direction and the magnetic components 22 are arranged in the peripheral direction. As a result, the magnetic components 22 form a magnetic circle. The magnetic components 22 may be mounted at an inner side of the annular casing 21 and annularly arranged apart from each other. Each one of the magnetic components 22 comprises at least one magnetic pole. The magnetic poles of the magnetic components 22 are arranged along the peripheral direction of the annular casing 21 in a staggered manner. A total amount of the magnetic poles of all the magnetic components is larger than that of the first branch containers 112 and that of the second branch containers 122.

Compared to the amount of the magnetic poles, which is equal to or less than the amount of spoke of the stator, of a conventional motor, the motor 1 provided by the present invention may generate a higher torque in the same output power because the amount of the magnetic poles of the rotor assembly 20 is larger than the amount of the first branch containers 112 or the second branch containers 122 of the stator assembly 10.

Besides, because the amount of the magnetic poles is not equal to the amount of the first branch containers 112 or the second branch containers 122, the magnetic components 22 may undergo unbalanced magnetic forces generated by the stator assembly 10 while the motor 1 is actuating the magnetic components 22, which drives the rotor assembly 20 to rotate immediately.

In a preferred embodiment, the amount of the magnetic pole is twenty and the amount of the first branch containers 112 or the second branch containers 122 is eighteen, which allows the rotating speed of the rotor assembly 20 to be equal to or less than 200 rpm.

As mentioned above, each one of the magnetic components 22 has at least one magnetic pole. If each magnetic component 22 has two or more magnetic poles, fewer magnetic components 22 can provide the same amount of magnetic poles, which simplifies the assembling process and improves manufacture efficiency.

By increasing the magnetic poles via adding the magnetic poles of each magnetic component 22 instead of adding the magnetic components 22, the size of the rotor assembly 20 may be kept the same.

In a preferred embodiment, each one of the magnetic components 22 comprises two magnetic poles. One is a north pole and the other one is a south pole. For example, one motor may have sixteen magnetic poles on its rotor and eighteen spokes on the stator, and each magnetic component provides one magnetic pole so that the motor has sixteen magnetic components. When said motor is modified to have twenty magnetic poles but still eighteen spokes, the rotor may have ten magnetic components and each magnetic component has two magnetic poles to prevent the size of the rotor from becoming larger correspondingly. Therefore, the size of the rotor having twenty magnetic poles may be the same as the original rotor having sixteen magnetic poles, and thus the same stator can be utilized. Similarly, each magnetic component may have four magnetic poles in other embodiments.

Figure 11:
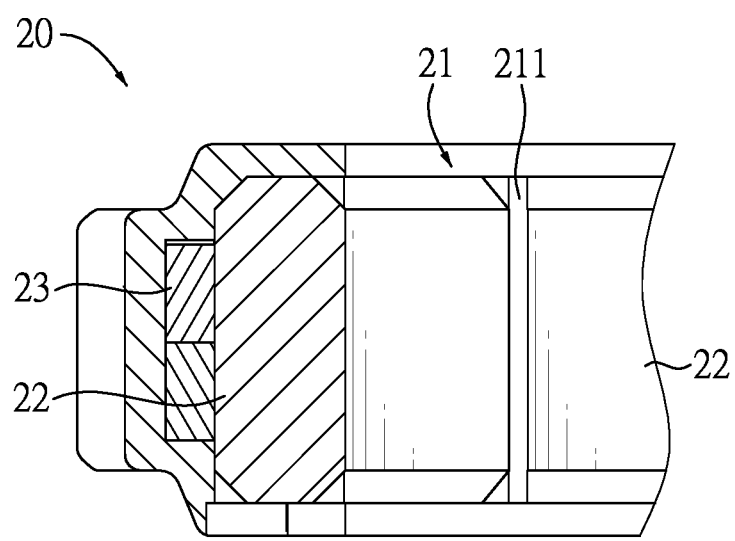
FIG. 11 is a sectional view of a rotor assembly of the motor in FIG. 2.
Figure 12:
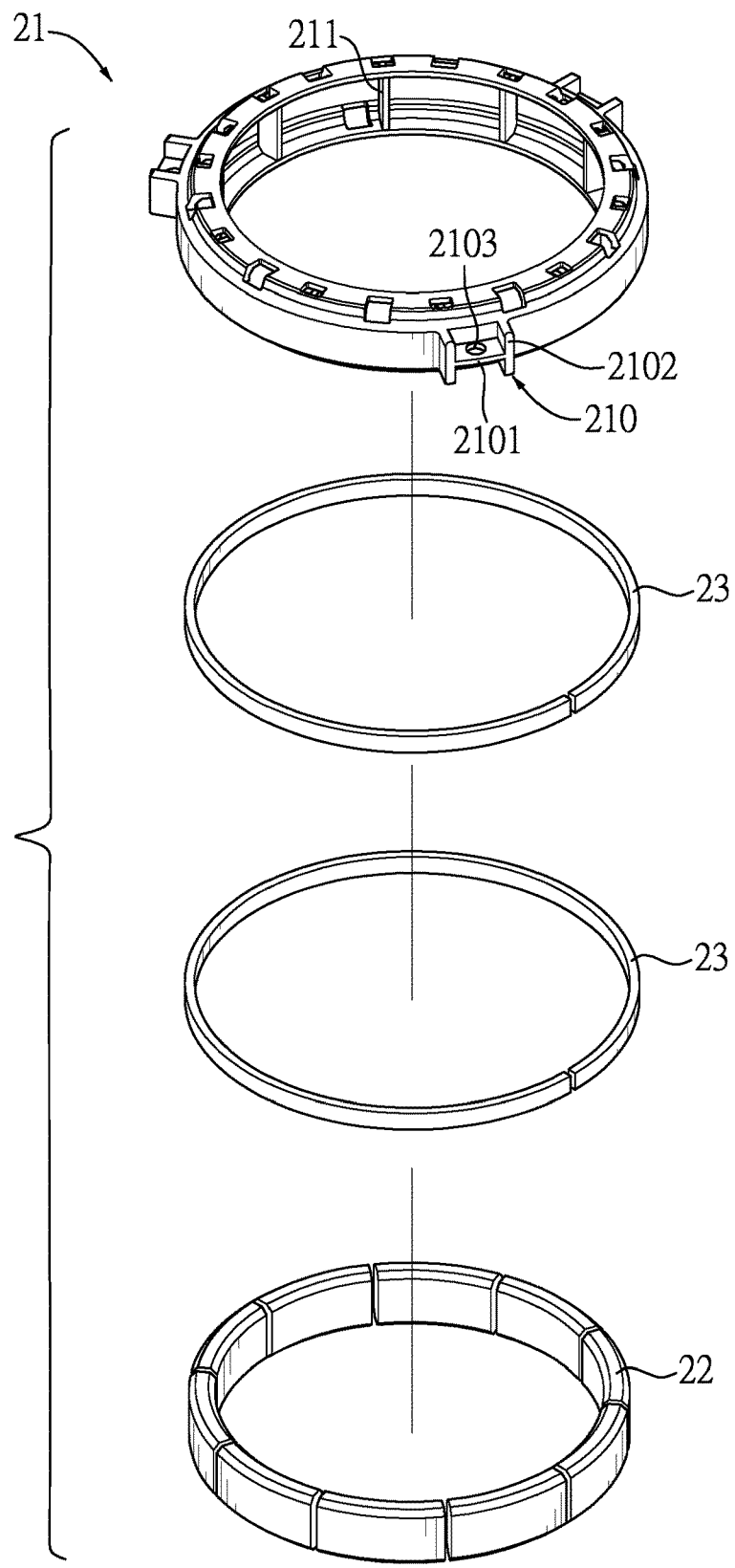
FIG. 12 is an expanded view of the rotor assembly in FIG. 11.

Then please refer to FIG. 3, FIG. 11, and FIG. 12. In a preferred embodiment, the rotor assembly 20 may further comprise a plurality of magnetic yokes 23. Each one of magnetic yokes 23 is sleeved on the outer side of the magnetic circle formed by the magnetic components 22. The magnetic yokes 23 are configured to increase the density of the magnetic flux at an air gap side, which improves the utilized efficiency of the permanent magnet material. Besides, with aforesaid structure, the power density of the motor 1 is increased so that the weight of the motor 1 can be reduced.

Precisely, each one of the magnetic yokes 23 is a steel ring with a gap (i.e. each magnetic yoke 23 is C-shaped), but it is not limited thereto, as the magnetic yokes 23 may be made from other materials. Before the magnetic yokes 23 are assembled in the rotor assembly 20, the inner diameter of the steel ring may be smaller than an outer diameter of the magnetic circle formed by the magnetic components 22; after the magnetic yokes 23 are assembled in the rotor assembly 20, the magnetic yokes 23 constrain the magnetic circle. In other words, the magnetic yokes 23 certainly abut the outer side of magnetic components 22 and inwardly press the magnetic components 22.

In a preferred embodiment, an amount of the magnetic yokes 23 may be two, but it is not limited thereto. The two magnetic yokes 23 are spaced apart at an interval along an axial direction of the magnetic yokes. In other words, the magnetic yokes 23 are spaced vertically.

In a preferred embodiment, the annular casing 21 may be made via injection molding and thus the magnetic components 22 and the magnetic yokes 23 are wrapped in the annular casing 21. In other words, the magnetic components 22 and the magnetic yokes 23 are fixed integrally, so that a distance between inner surfaces of the magnetic components 22 and the stator assembly 10 can be securely determined, which enhances the stability and unity. During injection molding, the magnetic components 22 and the magnetic yokes 23 are placed at a pre-determined position and then undergo injection molding. After the injection molding process is completed, the magnetic components 22 and the magnetic yokes 23 are securely fixed in the annular casing 21. Therefore, the aforesaid manufacture process has the following advantages: high producing efficiency, applicability for mass production, high precision of positions of the magnetic components 22 and the magnetic yokes, and lower production cost.

In a preferred embodiment, the rotor assembly 20 may comprise a plurality of mounting bases 210 mounted on an outer surface of the annular casing 21. Each one of the mounting bases 210 may form a connecting hole 2103 configured to receive one fan blade 2 mounted therein, which facilitates ease in installation of the ceiling fan.

Each one of the mounting bases 210 comprises a connecting plate 2101 and two restriction plates 2102. The connecting hole 2103 is a through hole and is formed through each one of the connecting plates 2101. A restriction space is formed between the two restriction plates 2102 and configured to restrict a respective one of the fan blades 2. The connecting plate 2101 is located between the two restriction plates 2102. The corresponding fan blade can be mounted on an upper portion of the connecting plate 2101 and can be mounted on a lower portion of the connecting plate 2101.

In a preferred embodiment, each one of the magnetic components 22 is a curved cuboid with a larger curved surface and a smaller curved surface opposite each other. In other words, the larger curved surface is the outer surface of the magnetic component 22 and the smaller curved surface is the inner surface of the magnetic component 22. The smaller curved surface of each magnetic component 22 is exposed from the annular casing 21. In other words, the inner surface of each magnetic component 22 is not covered by the annular casing 21, which prevents the magnetic components 22 from being damaged or forming burrs during manufacture and keeps the smaller curved surface of each magnetic component 22 clear.

Moreover, the annular casing 21 further comprises a plurality of partitions 211 inside the annular casing 21. Each one of the magnetic components 22 is mounted between the two adjacent partitions 211, which positions the magnetic components 22 in the radial direction of the annular casing 21.

Consequently, with the first protrusions 113 respectively formed on the first branch containers 112 and the second protrusions 123 respectively formed on the second branch containers 122, the sectional area of each one of the coils 15 may be an ellipse or an oval rather than a rectangle conventionally, so the magnetic flux therein is larger, which provides a stronger magnetic field and concentrates the magnetic poles thereof, and electric energy can be converted to torques to drive the rotor assembly 20 in higher efficiency. Besides, because the amount of the magnetic poles of the rotor assembly 20 is more than the amount of the coils 15, the first branch containers 112, or the second branch containers 122, the motor can provide a higher torque even at a lower rotating speed.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A motor configured to be mounted in a ceiling fan, the motor comprising:
    a stator assembly comprising:
        a stator frame comprising:
            a first isolated frame comprising:
                a first casing having a first axial direction and a plurality of first radial directions perpendicular to the first axial direction;
                a plurality of first branch containers mounted on the first casing and extending outward from the first casing respectively in the first radial directions; and
                a plurality of first protrusions respectively formed on the first branch containers;
            a second isolated frame comprising:
                a second casing having a second axial direction parallel to the first axial direction and a plurality of second radial directions perpendicular to the second axial direction;
                a plurality of second branch containers mounted on the second casing and extending outward from the second casing respectively in the second radial directions; each one of the second branch containers corresponding to a respective one of the first branch containers in location; and
                a plurality of second protrusions respectively formed on the second branch containers;
            a receiving space formed by the first isolated frame and the second isolated frame and located between the first isolated frame and the second isolated frame;
            wherein the first protrusions protrude from a side, which is away from the receiving space, of the first casing, and the second protrusions protrude from a side, which is away from the receiving space, of the second casing;
        a stator core securely mounted in the receiving space; and a plurality of coils, each one of the coils wound around a respective one of the first branch containers and a corresponding one of the second branch containers;

wherein one of the first isolated frame and the second isolated frame comprises:

a mounting projection projecting toward the other one of the first isolated frame and the second isolated frame; and the other one of the first isolated frame and the second isolated frame comprises:

a mounting cavity configured to engage the mounting projection.

2. The motor as claimed in claim 1, wherein:

portions that join the first protrusions and the first branch containers are filleted; and portions that join the second protrusions and the second branch containers are filleted.

3. The motor as claimed in claim 2, wherein:

portions that join the first protrusions and the first branch containers are arc-shaped; and portions that join the second protrusions and the second branch containers are arc-shaped.

4. The motor as claimed in claim 1, wherein:

the first casing comprises:

a first shaft mounting hole at a center of the first casing configured to receive a shaft mounted therein; and the second casing comprises:

a second shaft mounting hole at a center of the second casing configured to receive a shaft mounted therein;

the first shaft mounting hole and the second shaft mounting hole are aligned with each other.

5. The motor as claimed in claim 1, wherein the first isolated frame further comprises:

a plurality of barrier boards mounted on the first casing and respectively close to the first branch containers; an amount of the barrier boards being equal to an amount of the first branch containers; and a plurality of notches disposed staggered with respect to the first branch containers; an amount of the notches being equal to the amount of the first branch containers; each one of the notches formed between two adjacent ones of the barrier boards.

6. The motor as claimed in claim 1, wherein:

the first isolated frame further comprises:

a first restriction annulus formed on the first casing and located between the first casing and the second casing; and the stator core abuts an outer surface of the first restriction annulus.

7. The motor as claimed in claim 1, wherein:

the second isolated frame further comprises:

a second restriction annulus mounted on the second casing and located between the first casing and the second casing; and the stator core abuts an outer surface of the second restriction annulus.

8. The motor as claimed in claim 1, wherein the motor further comprises:

a rotor assembly comprising:

an annular casing sleeving the stator assembly; and a plurality of magnetic components mounted on an inner side of the annular casing and annularly arranged apart from each other; each one of the magnetic components comprising at least one magnetic pole; the magnetic components arranged annually and integrally forming:

a magnetic circle; an amount of the magnetic poles of the magnetic components being larger than that of the first branch containers or the second branch containers of the stator assembly.

9. The motor as claimed in claim 8, wherein the amount of the magnetic poles of the magnetic components is twenty and the amounts of the both first branch containers and the second branch containers of the stator assembly are each eighteen.

10. The motor as claimed in claim 8, wherein the at least one magnetic pole of each one of the magnetic components includes two said magnetic poles; the two magnetic poles are respectively a north pole and a south pole; in the magnetic circle, the north poles and the south poles of the magnetic components are arranged along the magnetic circle and in a staggered manner.

11. The motor as claimed in claim 8, wherein the rotor assembly further comprises:

at least one magnetic yoke sleeved on the magnetic circle.

12. The motor as claimed in claim 11, wherein each one of the at least one magnetic yoke is a ring with a gap; before the ring is assembled in the rotor assembly, an inner diameter of the ring is smaller than an outer diameter of the magnetic circle; after the ring is assembled, the ring constrains the magnetic circle.

13. The motor as claimed in claim 11, wherein the at least one magnetic yoke includes two said magnetic yokes spaced at an interval along an axial direction of the magnetic yokes.

14. The motor as claimed in claim 11, wherein the annular casing is wrapped on the magnetic components and the at least one magnetic yoke by injection molding.

15. The motor as claimed in claim 8, wherein each one of the magnetic components is a curved cuboid with a larger curved surface and a smaller curved surface opposite each other; the smaller curved surface is exposed from the annular casing.

16. The motor as claimed in claim 8, wherein the rotor assembly further comprises:

a plurality of mounting bases mounted on an outer surface of the annular casing and each one of the mounting bases configured to accommodate a fan blade mounted thereon.

17. A motor configured to be mounted in a ceiling fan, the motor comprising:

a stator assembly comprising:

a stator frame comprising:

a first isolated frame comprising:

a first casing having a first axial direction and a plurality of first radial directions perpendicular to the first axial direction;

a plurality of first branch containers mounted on the first casing and extending outward from the first casing respectively in the first radial directions; and a plurality of first protrusions respectively formed on the first branch containers;

a second isolated frame comprising:

a second casing having a second axial direction parallel to the first axial direction and a plurality of second radial directions perpendicular to the second axial direction;

a plurality of second branch containers mounted on the second casing and extending outward from the second casing respectively in the second radial directions; each one of the second branch containers corresponding to a respective one of the first branch containers in location; and a plurality of second protrusions respectively formed on the second branch containers;

a receiving space formed by the first isolated frame and the second isolated frame and located between the first isolated frame and the second isolated frame;

wherein the first protrusions protrude from a side, which is away from the receiving space, of the first casing, and the second protrusions protrude from a side, which is away from the receiving space, of the second casing;

a stator core securely mounted in the receiving space; and a plurality of coils, each one of the coils wound around a respective one of the first branch containers and a corresponding one of the second branch containers; and a rotor assembly comprising:
an annular casing sleeving the stator assembly;
a plurality of magnetic components mounted on an inner side of the annular casing and annularly arranged apart from each other; each one of the magnetic components comprising at least one magnetic pole; the magnetic components arranged annually and integrally forming:
a magnetic circle; an amount of the magnetic poles of the magnetic components being larger than that of the first branch containers or the second branch containers of the stator assembly; and
at least one magnetic yoke sleeved on the magnetic circle;
wherein the at least one magnetic yoke includes two said magnetic yokes spaced at an interval along an axial direction of the magnetic yokes.

18. A motor configured to be mounted in a ceiling fan, the motor comprising:
a stator assembly comprising:
a stator frame comprising:
a first isolated frame comprising:
a first casing having a first axial direction and a plurality of first radial directions perpendicular to the first axial direction;
a plurality of first branch containers mounted on the first casing and extending outward from the first casing respectively in the first radial directions; and a plurality of first protrusions respectively formed on the first branch containers;
a second isolated frame comprising:
a second casing having a second axial direction parallel to the first axial direction and a plurality of second radial directions perpendicular to the second axial direction;
a plurality of second branch containers mounted on the second casing and extending outward from the second casing respectively in the second radial directions; each one of the second branch containers corresponding to a respective one of the first branch containers in location; and
a plurality of second protrusions respectively formed on the second branch containers;
a receiving space formed by the first isolated frame and the second isolated frame and located between the first isolated frame and the second isolated frame;
wherein the first protrusions protrude from a side, which is away from the receiving space, of the first casing, and the second protrusions protrude from a side, which is away from the receiving space, of the second casing;
a stator core securely mounted in the receiving space; and
a plurality of coils, each one of the coils wound around a respective one of the first branch containers and a corresponding one of the second branch containers; and
a rotor assembly comprising:
an annular casing sleeving the stator assembly;
a plurality of magnetic components mounted on an inner side of the annular casing and annularly arranged apart from each other; each one of the magnetic components comprising at least one magnetic pole; the magnetic components arranged annually and integrally forming:
a magnetic circle; an amount of the magnetic poles of the magnetic components being larger than that of the first branch containers or the second branch containers of the stator assembly; and
at least one magnetic yoke sleeved on the magnetic circle;
wherein the annular casing is wrapped on the magnetic components and the at least one magnetic yoke by injection molding.

* * * * *